United States Patent Office 3,314,843
Patented Apr. 18, 1967

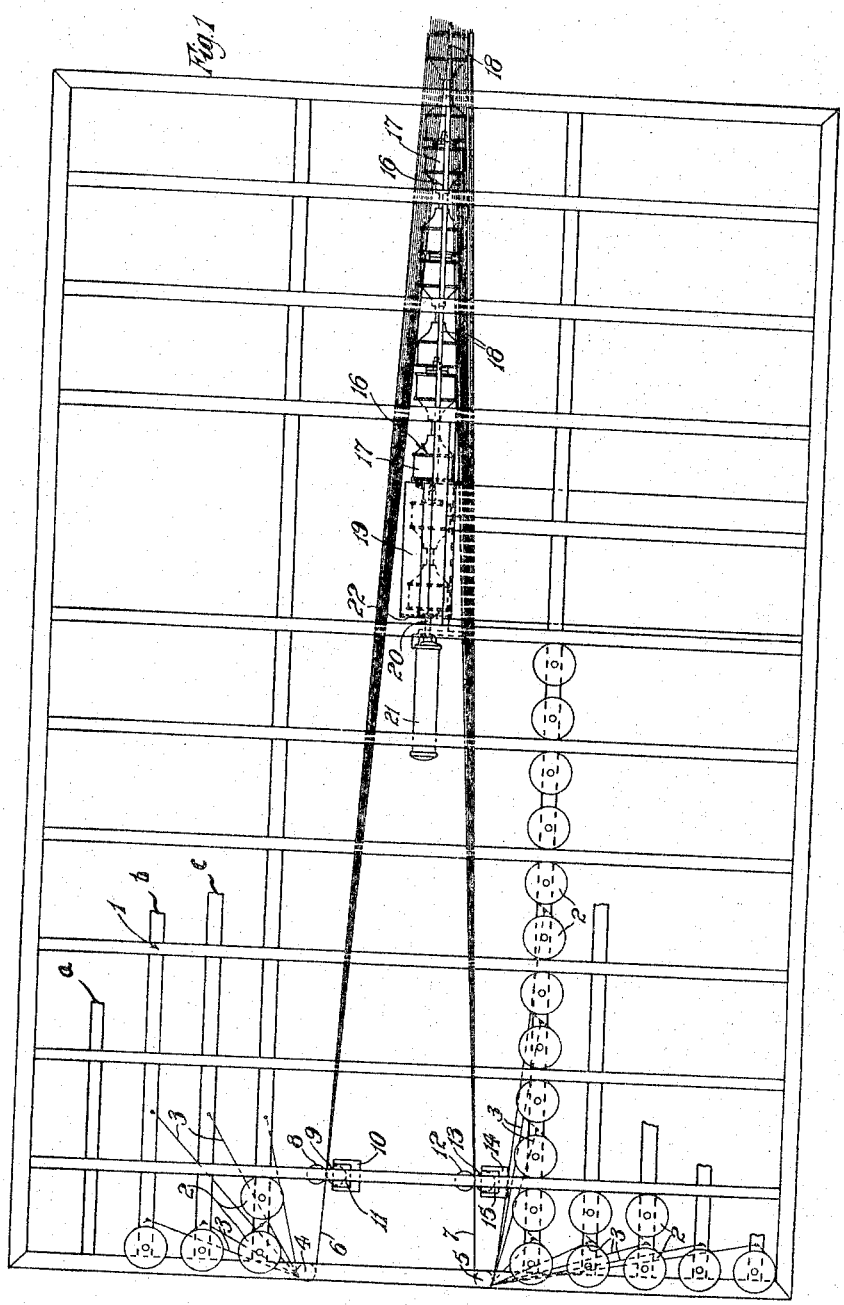

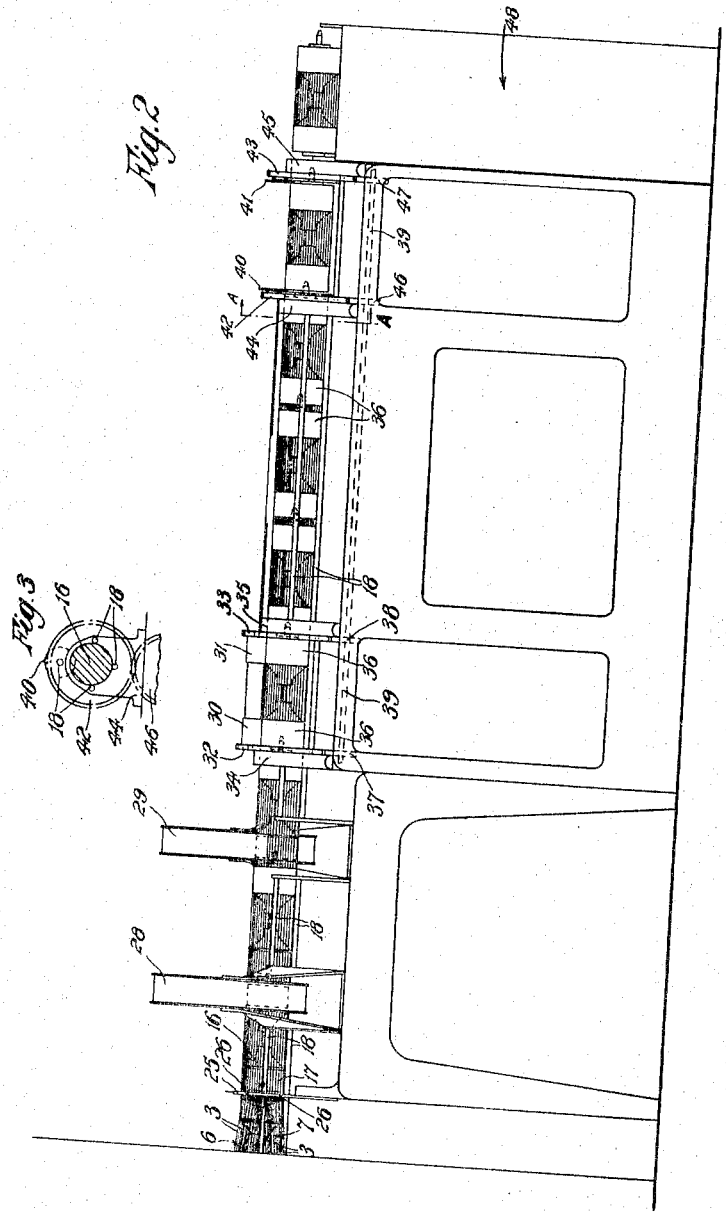

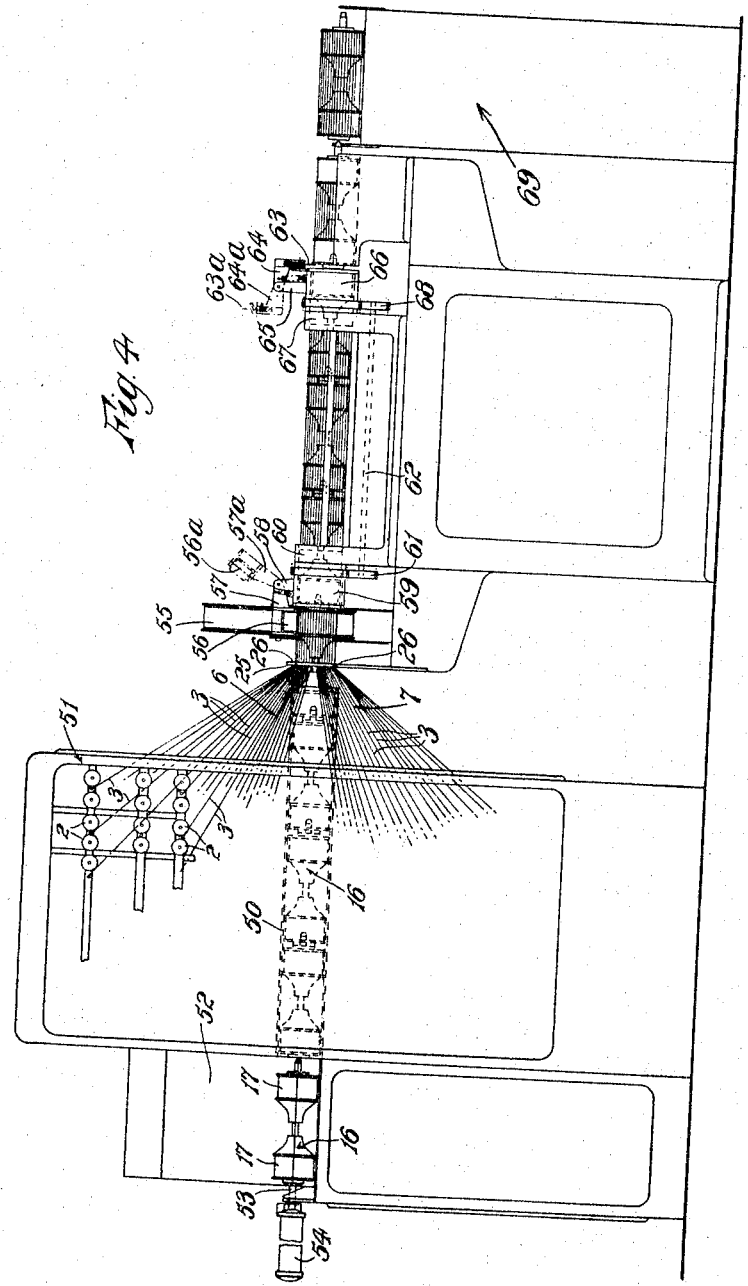

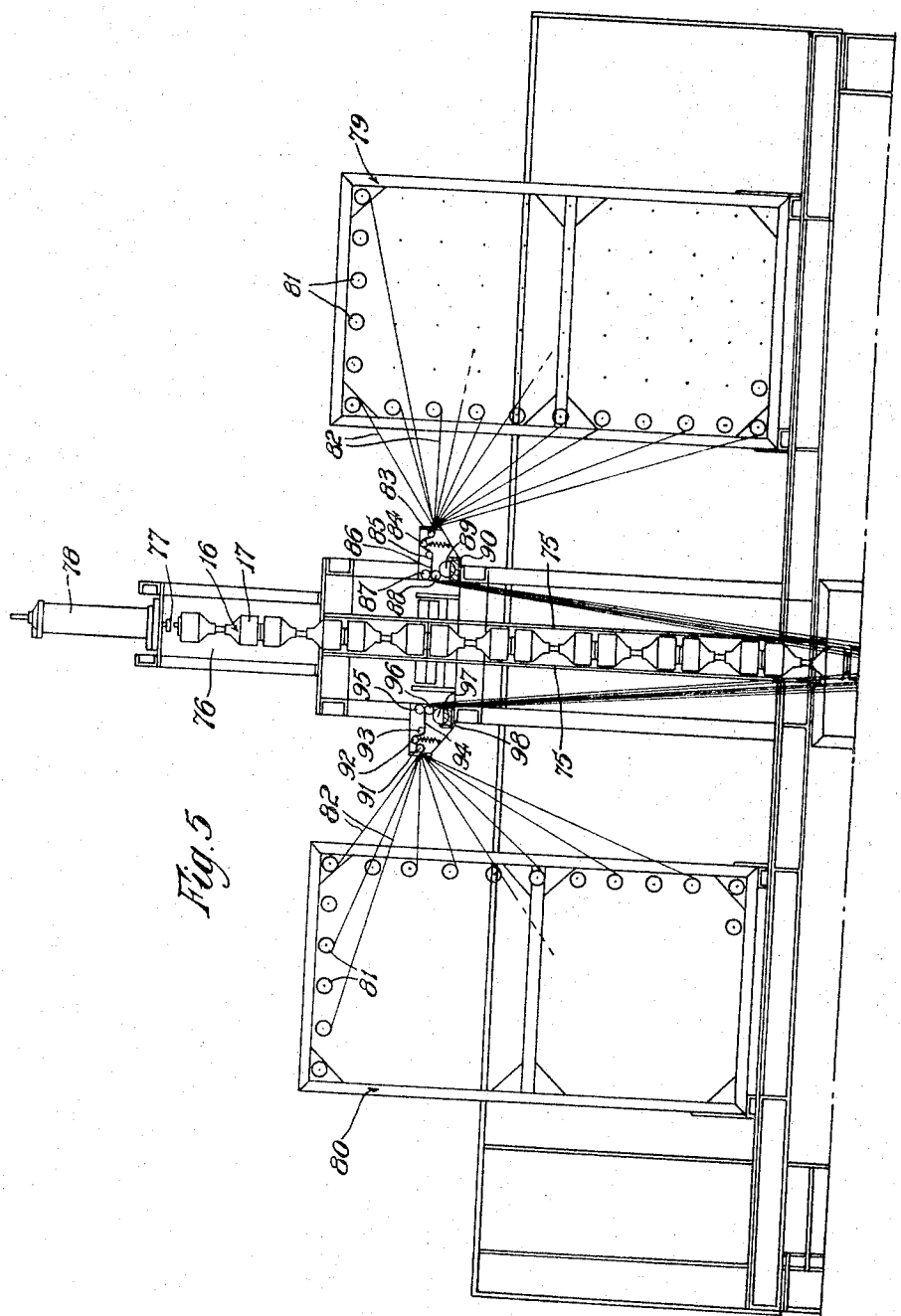

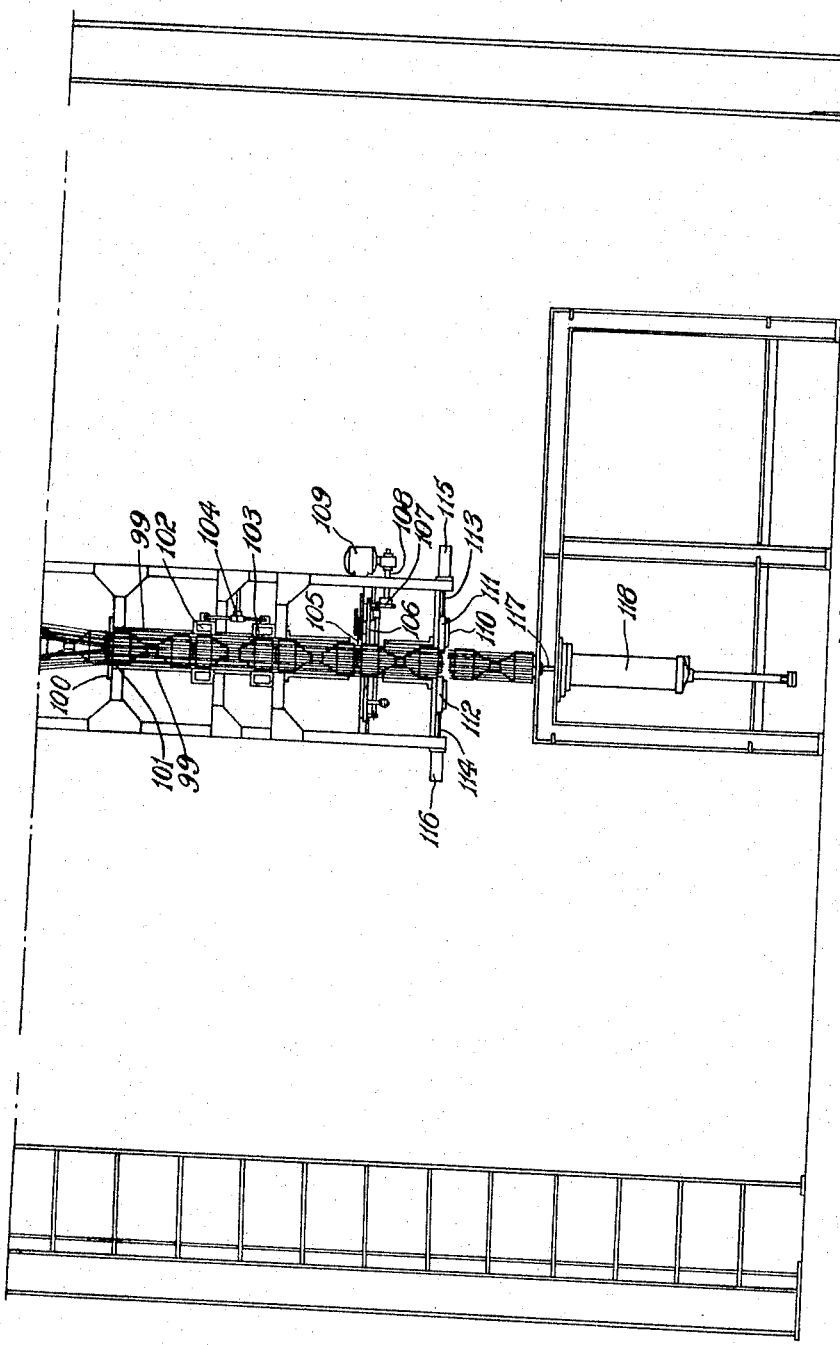

3,314,843
APPARATUS FOR ASSEMBLING THE REINFORCEMENT CORDS IN THE MANUFACTURE OF DIAPHRAGMS
Brian Harry Beebee, Walsall, and Harold Arthur Iles, Tyseley, Birmingham, England, assignors to Dunlop Rubber Company Limited, London, England, a British company
Filed Nov. 15, 1963, Ser. No. 324,131
Claims priority, application Great Britain, Nov. 22, 1962, 44,113/62
32 Claims. (Cl. 156—433)

This invention relates to an improved apparatus for providing and positioning the reinforcement cords which form part of rolling lobe diaphragms, during the production of the diaphragms.

According to the present invention, an apparatus for assembling the reinforcement cords in the manufacture of rolling lobe diaphragms comprises guide means for spacing cords peripherally of a succession of axially aligned forming reels each having a circumferential covering of a flexible material on its end portions, a reel magazine, means for guiding a succession of axially aligned forming reels from the reel magazine through a laying zone, and a cutting zone, means for intermittently advancing the forming reels through the laying, and cutting zones by a predetermined distance, pressing means in the laying zone for pressing the cords into contact with the flexible material on the end portions of the forming reels, and cutting means in the cutting zone for severing the cords between the end portions of adjacent forming reels.

The forming reel used in the manufacture of a rolling lobe diaphragm comprises two halves each half comprising an end portion being cylindrical in form and axially inwardly of each end portion a concavely curved portion in the form of a hyperboloid portion terminating in an end of lesser diameter than the diameter of the cylindrical portion and the two hyperboloid portions being connected together by a rod. One half is rotatable with respect to the other so that rotation of this half causes the two halves to move into contact with each other.

In the manufacture of a rolling lobe diaphragm, the hyperboloid and cylindrical portions of each half of the forming reel are covered with a flexible material, cords are laid along and spaced peripherally of the forming reels, and the cords are pressed into contact with the flexible material on the cylindrical portions of the forming reel. A covering of flexible material is applied over the cords on the cylindrical portion and is pressed thereon. The cords may be pressed into contact with the flexible material on the cylindrical portions simultaneously with the pressing of the covering of flexible material onto the cords, and in this way only one pressing operation is necessary. One end part of the forming reel is rotated relative to the other end to cause the halves of the forming reel to move into contact with each other and to cause the cords to become embedded in the flexible material on the hyperboloid portions of the forming reels. A covering of a flexible material is applied to, and pressed onto the cords on the hyperboloid portions, and the assembly is then removed from the forming reel. A bead wire ring is applied over the central portion of the resultant tube, one end of which is then drawn back over the bead wire ring and over the other end to form a two ply structure enclosing the bead wire ring at one end. The assembly is then moulded under heat and pressure to produce a rolling lobe diaphragm.

The present invention provides an apparatus for assembling the cords along the forming reel and for adhering the cords to the flexible material on the cylindrical portions of the forming reels. In the apparatus guide means are provided for spacing cords peripherally of the forming reels, which are passed through the apparatus in axially aligned relationship. The guide means may be a plate or an annular ring provided with apertures through which the cords are passed. The cords are preferably assembled into sheets on opposite sides of the forming prior to passing them through the apertures in the guide means, and the sheets may be formed within the apparatus by drawing the cords off bobbins contained in a creel frame around a roller. Alternatively, the sheets of cords may be preformed and wound on beams from which they are drawn directly to the guide means.

Usually, means are provided for coating the cords with an adhesive composition prior to passing the cords through the guide means. The coating can be applied by means of rollers, one of which dips into a bath containing the adhesive composition.

The guide means is located at one end of the laying zone, in which zone are provided means for pressing the cords into intimate contact with the flexible material on the cylindrical portions of a forming reel. The cords may be pressed directly onto the flexible material in which case the pressing means may be one or more annular pneumatic bags provided with means for inflation and deflection. The pneumatic bags are deflated during movement of the forming reels and inflated when the forming reels are stationary.

Means may be provided for covering the cords on the cylindrical portions of the forming reels with a flexible material and for pressing the covering onto the underlying cords to embed these in the flexible material. The pressing means which press the covering on to the cords may also serve to press the cords onto the flexible material on the forming reels, and so separate pressing means to press the cords onto the flexible material prior to the application of the covering are not essential.

In the case where a covering is applied to the cords, this may be applied in a sheeting zone which is located in the laying zone. One or more rolls of the flexible material may be provided in the sheeting zone for application over the cords. The pressing means in the sheeting zone to press the covering onto the underlying cords may be one or more rollers, preferably having a serrated circumferential surface, which are mounted on circular carriages rotatable around the forming reels. The rollers are mounted so as to be retractable from the path of the forming reels during movement of the forming reels through the apparatus.

A cutter is provided in the cutting zone for severing the cords between the ends of adjacent forming reels, said cutter being separated from the pressing means in the laying zone by a distance such as to accommodate at least two forming reels. This distance is preferably sufficient to accommodate several forming reels so that adhesion of the cords to the flexible material on the forming reels is sufficient to draw the cords through the apparatus. The cutter may be a knife or a rotatable disc having a cutting edge, and is usually mounted on a circular carriage which is rotatable around the forming reels. The cutter is retracted from the path of the forming reels during movement thereof through the apparatus.

Means maybe provided, such as a conveyor belt for carrying the forming reels having the cords assembled thereon to the next operation in the production of a rolling lobe diaphragm.

In the apparatus, means are provided for intermittently advancing the forming reels through the apparatus, and further means are provided for guiding the forming reels through the laying and cutting zones. The latter means may be a cylindrical tube, but is preferably a number of parallel rails covered with polytetrafluoroethylene. The means for advancing the forming reels through the apparatus is preferably a plunger slidable within a cylinder operable pneumatically, which plunger pushes the forming reels through the apparatus. The distance through which the rollers are intermittently advanced is dependent on the arrangement of the pressing means in the laying zone and is such as to move the forming reels so that a cylindrical portion is positioned corresponding to the position of the pressing means. Usually the distance will be equal to length of a forming reel plus the distance between adjacent forming reels.

The invention is advantageous in that the apparatus enables the reinforcing cords to be accurately assembled on the forming reels without the necessity of employing winding machinery, and without the presence of mechanical retaining means on the forming reels such as teeth which are liable to accidental damage.

Three forms of apparatus constructed in accordance with the invention will not be described by way of example only with reference to the accompanying drawings, in which, FIGURE 1 shows an apparatus for assembling cords into sheets prior to spacing the cords peripherally of a succession of axially aligned forming reels, FIGURE 2 shows an apparatus for covering the cords on the end of the forming reels with sheets of a flexible material, and for severing the cords between adjacent forming reels, FIGURE 3 shows a view of the cutter of FIGURE 2 taken in the direction A-A' of FIGURE 2, FIGURE 4 shows an alternative form of apparatus to that shown in FIGURES 1 and 2, for laying cords peripherally of forming reels, providing the cords with a covering of flexible material and severing the cords between adjacent forming reels, FIGURE 5 shows an apparatus for assembling cords into sheets for assembling on a vertical succession of axially aligned forming reels, and FIGURE 6 is a continuation of FIGURE 5 and shows an apparatus for assembling cords peripherally of a vertical succession of axially aligned forming reels and severing the cords between adjacent forming reels.

In the apparatus shown in FIGURE 1, a creel frame 1, shown broken away in various places, as at *a*, *b* and *c*, carries a number of bobbins 2 of cords 3. In FIGURE 1 only a few of the bobbins 2 are shown for clarification but it is to be understood that the creel frame 1 carries a large number of such bobbins, e.g. if 424 cords are required for assembling on the forming reels then there will be 424 bobbins on the creel frame. Two rollers 4 and 5 are provided for assembling the cords 3 into two sheets 6 and 7 in which the cords 3 are arranged in substantially side by side relationship. Two rollers 8 and 9 extend across the sheet 6 one on each side of the sheet 6 and the lower roller 9 dips into a bath 10 containing rubber solution 11. The rollers 8 and 9 are not provided with driving means and are caused to rotate by movement of the sheet 6 when the apparatus is in use. A similar arrangement is provided to coat the cords 3 of the sheet 7; two rollers 12 and 13 are provided, the lower roller 13 dipping into a bath 14 containing rubber solution 15. The sheets 6 and 7 of cords 3 are arranged in the apparatus one on each side of a succession of axially aligned forming reels 16, each end of a forming reel 16 having a cylindrical portion 17. The forming reels 16 are carried on guide rails 18 which have a coating of polytetrafluoroethylene. The forming reels 16 are arranged on the guide rails 18 in axially aligned relationship, and are led onto the guide rails from a reel magazine 19 which is a cylinder of length slightly greater than the length of a forming reel 16 and which has a lining of polytetrafluoroethylene. The forming reels 16 are loaded into the reel magazine 19 automatically and a pneumatically operated plunger 20, slidable within an air-cylinder 21 is provided at the open end 22 of the reel magazine 19 for pushing the forming reels 16 through the apparatus.

A guide ring 25 as shown in FIGURE 2 is provided for spacing the cords 3 of the sheets 6 and 7 assembled as described above and shown in FIGURE 1 peripherally of the axially aligned forming reels 16. It is to be understood that the apparatus shown in FIGURE 2 is a continuation of that shown in FIGURE 1, and that the guide ring 25 of that shown in FIGURE 1, and that the guide ring 25 is positioned a short distance from the end of the creel frame 1 shown in FIGURE 1.

The guide ring 25 is a ring of internal diameter slightly greater than the diameter of the cylindrical portions 17 of the forming reels 16 and has a number of apertures 26 in it through which the cords 3 of the sheets 6 and 7 are passed. The number of apertures corresponds to the number of cords to be spaced peripherally of the forming reels 16. Rolls 28 and 29 of a flexible material are located close to the guide ring 25 for application of the cords on the cylindrical portions 17 of the forming reels 16, and are located in positions corresponding to the position of a cylindrical portion 17. The guide rails 18 are broken away in these positions to allow access to the forming reels 16. Two freely rotatable rollers 30 and 31 each having a serrated circumferential surface are located in positions corresponding to the position of a cylindrical portion 17 of a forming reel 16. The rollers 30 and 31 are mounted with provision for radial movement in circular carriages 32 and 33 respectively so that they can be withdrawn from the path of the forming reels 16. The carriages 32 and 33 are rotatably mounted in supports 34 and 35 so that they are rotatable about the forming reels 16 to cause the rollers 30 and 31 to press a sheet 36 of flexible material onto the cords 3 on the cylindrical portions 17 of the forming reels 16. The guide rails 18 are broken away in these positions to allow the rollers 30 and 31 to move around the forming reels 16. The carriages 32 and 33 are caused to rotate by means of drive wheels 37 and 38 respectively which are carried on a driven shaft 39. Two cutters 40 and 41 are provided for severing the cords 3 between adjacent forming reels 16, the cutter 40 being positioned at a distance from the roller 31 such as to accommodate three forming reels 16. The cutters 40 and 41 are rotating discs, and they are mounted with provision for radial movement in circular carriages 42 and 43 respectively, the carriages 42 and 43 being mounted in supports 44 and 45 respectively and being rotatable around the forming reels 16. The carriages 42 and 43 are caused to rotate by means of driving wheels 46 and 47 carried on the driven shaft 39 which also carries the driving wheel 37 and 38 for the carriages 34 and 35. The guide rails 18 are broken away in the regions of the cutters 40 and 41 to allow the cutters to move around the forming reels 16. The guide rails 18 terminate at the support 45, and a conveyor 48 is provided for carrying the covered forming reels to the next operation in the production of a rolling lobe diaphragm.

In the method of using the apparatus shown in FIGURES 1 and 2, cords 3 are drawn off bobbins 2 in a creel frame 1 and assembled into two sheets 6 and 7, one sheet being positioned on each side of a succession of axially aligned forming reels 16. The cords 3 of the sheet 6 are coated with rubber by passing the sheet 6 through the nip between two rollers 8 and 9, the roller 9 dipping into a bath 10 containing rubber solution 11. The sheet 7 is similarly coated by the rollers 12 and 13, the roller 13 dipping into a bath 14 containing rubber solution 15. The succession of forming reels 16 is carried on guide rails 18 and forming reels 16 are supplied to the guide rails 18 from a reel magazine 19 which is loaded automatically. The reels are pushed along the guide rails by the pneumatically operated plunger 20 which is slidable in the air cylinder 21. The forming reels 16 are moved through a distance equal to the length of a forming reel 16 plus the distance between adjacent forming reels.

The cords 3 of the sheets 6 and 7 are spaced peripherally of the forming reels 16 by the guide ring 25 as shown in FIGURE 2 and a strip 36 of rubber from the rolls 28 and 29 is applied over the cords 3 on the cylindrical portions 17 of the forming reels 16. The rubber is pressed onto the cords by the rollers 30 and 31, and the cords 3 between adjacent forming reels 16 are severed by the cutters 40 and 41. The distance between the roller 31 and the cutter 40 is such as to accommodate three forming reels 16, to which the cords are firmly adhered so that movement of these reels draws the cords 3 off the bobbins 2 in the creel frame 1. An end view of the cutter 40 is shown in FIGURE 3. After the cords 3 have been severed by the cutters 40 and 41, an operative removes the covered reels and places them on a conveyor belt 48 which carries them to the next operation in the production of a rolling lobe diaphragm.

FIGURE 4 shows an alternative form of apparatus to that shown in FIGURES 1 and 2. In the apparatus shown in FIGURE 4 a succession of axially aligned forming reels 16 is carried in a guide tube 50 through a creel frame 51. The guide tube 50 is a cylindrical tube having a lining of polytrafluoroethylene, and the guide tube 50 is positioned at one end of a loading magazine 52 to which forming reels 16 are fed automatically. A pneumatically operated plunger 53, slidable within an air cylinder 54 is positioned at one end of the loading magazine 52 to push the forming reels 16 through the apparatus. In FIGURE 4 only a few of the bobbins 2 of cords 3 in the creel frame 51 are shown, but it is to be understood that a large number of such bobbins are provided. The cords 3 are drawn off the bobbins 2 in sheets 6 and 7 which pass to the guide ring 25.

The guide ring 25 is positioned adjacent the end of the guide tube 50 to space the cords 3 of the sheets 6 and 7 peripherally of the forming reels 16. Guide rails 18 extend from close to one end of the loading magazine 52 to carry the forming reels 16 through laying, sheeting and cutting zones. Adjacent the guide ring 25 is positioned a roll 55 of rubber for application to the cords on the cylindrical portions 17 of the forming reels 16. A serrated roller 56 is provided for pressing the flexible material from the roll 55 on to the cords 3. The roller 56 is carried on an arm 57 which is pivotally mounted on an arm 58 carried on a rotatable sleeve 59. The arm 57 which carries the roller 56 is pivotally mounted on the arm 58 so that the roller 56 can be moved out of the path of the forming reels 16 to the position as shown 56a and 57a. The sleeve 59 is mounted in a support 60 and is rotatable about the forming reels 16 so that the roller 56 presses the flexible material on to the cords 3. Driving means are provided for the rotatable sleeve 59, the driving means being a driving wheel 61 carried on a driven shaft 62. A cutter 63 is provided for severing the cords 3 between adjacent forming reels 16, the cutter 63 being a knife which is carried on an arm 64 pivotally mounted on an arm 65 carried on a rotatable sleeve 66. The rotatable sleeve 66 is mounted in a support 67 and is rotatable about the forming reels 16. The distance between the roller 56 and the cutter 63 is such as to accommodate three forming reels 16. Driving means are provided for the rotatable sleeve 66, the driving means being a driving wheel 68 carried on the driven shaft 62 which also carries the driving wheel 61 for the rotatable sleeve 59. The arm 64 which carries the cutter 63 is pivotally mounted on the arm 65 so that the cutter 63 can be moved out of the path of the forming reels 16 to the position as shown 63a and 64a. A conveyor 69 is positioned a short distance from the cutter 63 for carrying the covered forming reels to the next operation in the production of a rolling lobe diaphragm.

FIGURE 5 shows an apparatus in which the forming reels 16 are arranged vertically. In the apparatus shown in FIGURE 5 a succession of axially aligned forming reels 16 is carried on guide rails 75 which are rails having a covering of polytetrafluoroethylene. A loading magazine 76 into which forming reels 16 are loaded automatically is positioned at the top of the guide rails 75, and a pneumatically operated plunger 77, slidable within an air cylinder 78 is positioned at the top of the loading magazine 76 for pushing the forming reels 16 through the apparatus. The guide rails 75 extend between creel frames 79 and 80 carrying bobbins 81 of cords 82. Two other creel frames, which are not shown in FIGURE 5 for clarification, each the same as creel frames 79 and 80 are positioned one in front of, and one behind the guide rails 75. Three rollers 83, 84 and 85 are provided through which the cords 82 from the creel frame 79 are passed in a sinuous path to form a sheet 86 of cords 82. The rollers 83, 84 and 85 also provide the tension in the cords 82. Two rollers 87 and 88 are provided for coating the sheet 86 of cords 82 with a rubber solution, the roller 88 being in contact with a roller 89 dipping into a bath 90 containing rubber solution. Three rollers 91, 92 and 93 are provided for assembling the cords 82 from the creel frame 80 into a sheet 94 of cords 82. Two rollers 95 and 96 are provided for coating the sheet 94 with rubber, the lower roller 96 being in contact with a third roller 97 which dips into a bath 98 containing rubber solution. It is to be understood that a similar arrangement is provided for the sheets of cords from each of the creel frames not shown in FIGURE 5. In the apparatus shown in FIGURE 6, guide rails 99, coated with polytetrafluoroethylene extend from the lower end of the guide rails 75 for carrying the forming reels 16 through laying and cutting zones. A guide ring 100, provided with a number of apertures 101 is positioned at the top of the guide rails 99. The apparatus shown in FIGURE 6 is a continuation of that shown in FIGURE 5, and it is to be understood that the guide ring 100 is positioned at a distance of about the length of two forming reels 16 from the end of the guide rails 75 shown in FIGURE 5. Beneath the guide ring 100 at a distance equal to the length of one forming reel 16 are two annular pneumatic bags 102 and 103, each in a position corresponding to the cylindrical portion 17 of a forming reel 16. The annular pneumatic bags 102 and 103 have an internal diameter when inflated substantially equal to the diameter of the cylindrical portions 17 of a forming reel 16 and air is supplied to, and withdrawn from the bags 102 and 103 through the pipe 104. A knife 105 is provided for severing the cords 82 between adjacent forming reels 16. The knife 105 is mounted with provision for radial movement on a circular carriage 106 which is rotatable around the forming reels 16, and a driving wheel 107 mounted on a shaft 108 which is driven by a motor 109 is provided for driving the carriage 106.

A support plate 110 is positioned below the cutter, the support plate 110 being an annular plate having retractable portions 111 and 112 which engage the bottom end of a forming reel 16. The retractable portions 111 and 112 are mounted on pneumatically operated plungers 113 and 114 respectively which are slidable within air-cylinders 115 and 116. A pneumatically operated plunger 117, slidable within an air-cylinder 118 is positioned at the bottom of the stack of forming reels 16 for controlling the descent of the forming reels 16 through the apparatus. The plunger 117 works in synchronism with the plunger 77 and with the retractable portions 111 and 112 of the support plate 110. The guide rails 99 which are broken away in the regions of the pneumatic bags 102 and 103, and the cutter 105 stop at the support plate 110 to allow access to the forming reels 16 at the bottom of the apparatus.

The apparatus shown in FIGURES 5 and 6 has the advantage of a saving of floor space over the apparatus shown in FIGURES 1 and 2, and in FIGURE 4.

Having now described our invention, what we claim is:

1. An apparatus for assembling the reinforcement cords in the manufacture of rolling lobe diaphragms which comprises guide means for spacing cords peripherally of a succession of axially aligned individual forming reels each having a circumferential covering of a flexible material on its end portions, a reel magazine, means for guiding a succession of axially aligned individual forming reels from the reel magazine through a laying zone and a cutting zone, means for intermittently advancing the forming reels through the laying and cutting zones by a predetermined distance, pressing means in the laying zone for pressing the cords into contact with the flexible material on the circumferential end portions of the forming reels and not into contact with central portions of the reels, and cutting means in the cutting zone for severing the cords between the end portions of adjacent forming reels.

2. An apparatus according to claim 1 in which the guide means for spacing cords peripherally of the forming reels comprises a guide ring having an inner diameter slightly larger than the largest diameter of the forming reel, and having a number of apertures through which the cords are passed.

3. An apparatus according to claim 2 in which the guide ring is positioned adjacent one end of the reel magazine.

4. An apparatus according to claim 1, in which the reel magazine comprises a cylindrical tube having an internal diameter slightly larger than the largest diameter of the forming reel.

5. An apparatus according to claim 4 in which the cylindrical tube has a lining of polytetrafluoroethylene.

6. An apparatus according to claim 1 in which the means for guiding a succession of forming reels through the laying zone and the cutting zone comprises parallel rails covered with polytetrafluoroethylene.

7. An apparatus according to claim 1 in which the pressing means provided in the laying zone comprises an annular pneumatic bag of internal inflated diameter substantially equal to the largest diameter of a forming reel, said annular pneumatic bag being provided with means to inflate and deflate the bag.

8. An apparatus according to claim 1 in which means defining a sheeting zone are provided within the laying zone for applying a covering of a flexible material to the cords overlying the end portions of a forming reel.

9. An apparatus according to claim 1 in which rolls of a flexible sheet material are provided in the sheeting zone, for application of flexible sheet material to the cords on the end portions of each reel.

10. An apparatus according to claim 8 in which the pressing means provided in the laying zone to press the cords into contact with the flexible material on the end portions of a forming reel also serve to press the covering of a flexible material on to the cords on said end portions to consolidate the assembly.

11. An apparatus according to claim 10 in which the pressing means provided in the laying zone comprises a roller mounted on a circular carriage which is rotatable around the end portion of the forming reel.

12. An apparatus according to claim 11 in which the roller is mounted on the circular carriage with provision for radial movements, and means to retract the roller from the path of the forming reels during movement of the forming reels through the apparatus.

13. An apparatus according to claim 11 in which the roller is pivotally mounted on the circular carriage, and means to retract the roller from the path of the forming reels during movement of the forming reels through the apparatus.

14. An apparatus according to claim 11 in which two rollers are mounted each on a circular carriage which is rotatable around the end portion of a forming reel.

15. An apparatus according to claim 11 in which the roller has a serrated circumferential surface.

16. An apparatus according to claim 1 in which the cutting means comprises a rotatable disc having a cutting edge, mounted on a circular carriage which is rotatable around the forming reels.

17. An apparatus according to claim 16 in which the cutter is mounted on the circular carriage with provision for radial movement, and means to retract the cutter from the path of the forming reels during movement of the forming reels through the apparatus.

18. An apparatus according to claim 16 in which the cutter is pivotally mounted on the circular carriage, and means to retract the cutter from the path of the forming reels during movement of the forming reels through the apparatus.

19. An apparatus according to claim 1 in which a second cutting means is provided for trimming the ends of the severed cords from the ends of the forming reels.

20. An apparatus according to claim 19 in which the second cutting means comprises two rotatable discs each mounted on a circular carriage which is rotatable around the forming reels, said rotatable discs being located in positions one corresponding to each end of the forming reel.

21. An apparatus according to claim 1 in which the means for intermittently advancing the forming reels through a predetermined distance comprises a pneumatically operated plunger having a length of stroke equal to said predetermined distance.

22. An apparatus according to claim 21 in which the pneumatically operated plunger is located at one end of the reel magazine to push the forming reels through the apparatus.

23. An apparatus according to claim 1 in which means are provided for coating the cords with a suitable adhesive composition prior to assembly of the cords on the forming reels.

24. An apparatus according to claim 23 in which the means for coating the cords comprises two substantially parallel rollers between which the cords are passed, the lower of the rollers dipping into a bath containing the adhesive composition.

25. An apparatus according to claim 1 in which the guide means for the succession of axially aligned forming reels passes horizontally through the horizontally aligned laying and cutting zones.

26. An apparatus according to claim 1 in which the guide means for the succession of axially aligned forming reels passes vertically through the vertically aligned laying and cutting zones.

27. An apparatus according to claim 26 in which means are provided for supporting the forming reels while they are stationary within the apparatus.

28. An apparatus according to claim 27 in which the means for supporting the forming reels comprises a support plate having retractible portions which may be withdrawn from the path of the forming reels, and means to synchronize the withdrawal of said retractable portions being with the means for intermittently moving the forming reels through the apparatus.

29. An apparatus according to claim 27 in which a pneumatically operated plunger is positioned at the top of the vertical guide means to push the forming reels through the apparatus by a predetermined distance.

30. An apparatus according to claim 29 further comprising a second pneumatically operated plunger positioned at the bottom of the vertical guide means, below the support plate, for controlling the descent of the forming reels through the apparatus, and means to synchronize the movement of the first mentioned plunger with the movement of said second pneumatically operated plunger.

31. An apparatus according to claim 1 further comprising at least one creel frame carrying bobbins of cords for providing the cords for assembly on the forming reels.

32. An apparatus for assembling the reinforcement cords in the manufacture of rolling lobe diaphragms, which comprises guide means for spacing cords peripherally of a succession of axially aligned individual forming reels, each reel having a circumferential covering of a flexible material on its opposite end portions and having a reduced diameter central portion, a cylindrical tube having an internal diameter slightly larger than the largest diameter of the forming reel to enable the forming reels to be positioned in the cylindrical tube, means for guiding a succession of the forming reels from the cylindrical tube through a laying zone and a cutting zone, means for intermittently advancing the forming reels through the laying and cutting zones by a predetermined distance, pressing means in the laying zone for pressing the cords into contact with the flexible material on the circumferential end portions of the forming reels and not into contact with central portions of the reels, and cutting means in the cutting zone for severing the cords between the end portions of adjacent forming reels.

References Cited by the Examiner

UNITED STATES PATENTS

| | | | |
|---|---|---|---|
| 1,708,129 | 4/1929 | Gammeter | 156—396 |
| 2,571,717 | 10/1951 | Howald et al. | 156—441 X |
| 3,034,566 | 5/1962 | McKay | 156—441 |
| 3,186,885 | 6/1965 | Iles | 156—194 X |
| 3,198,878 | 8/1965 | Kaczerginski | 156—431 X |

EARL M. BERGERT, *Primary Examiner.*

J. P. MELOCHE, *Assistant Examiner.*